W. E. McCOY.
CONNECTION BLOCK.
APPLICATION FILED AUG. 24, 1909.
993,311.
Patented May 23, 1911.
4 SHEETS—SHEET 1.
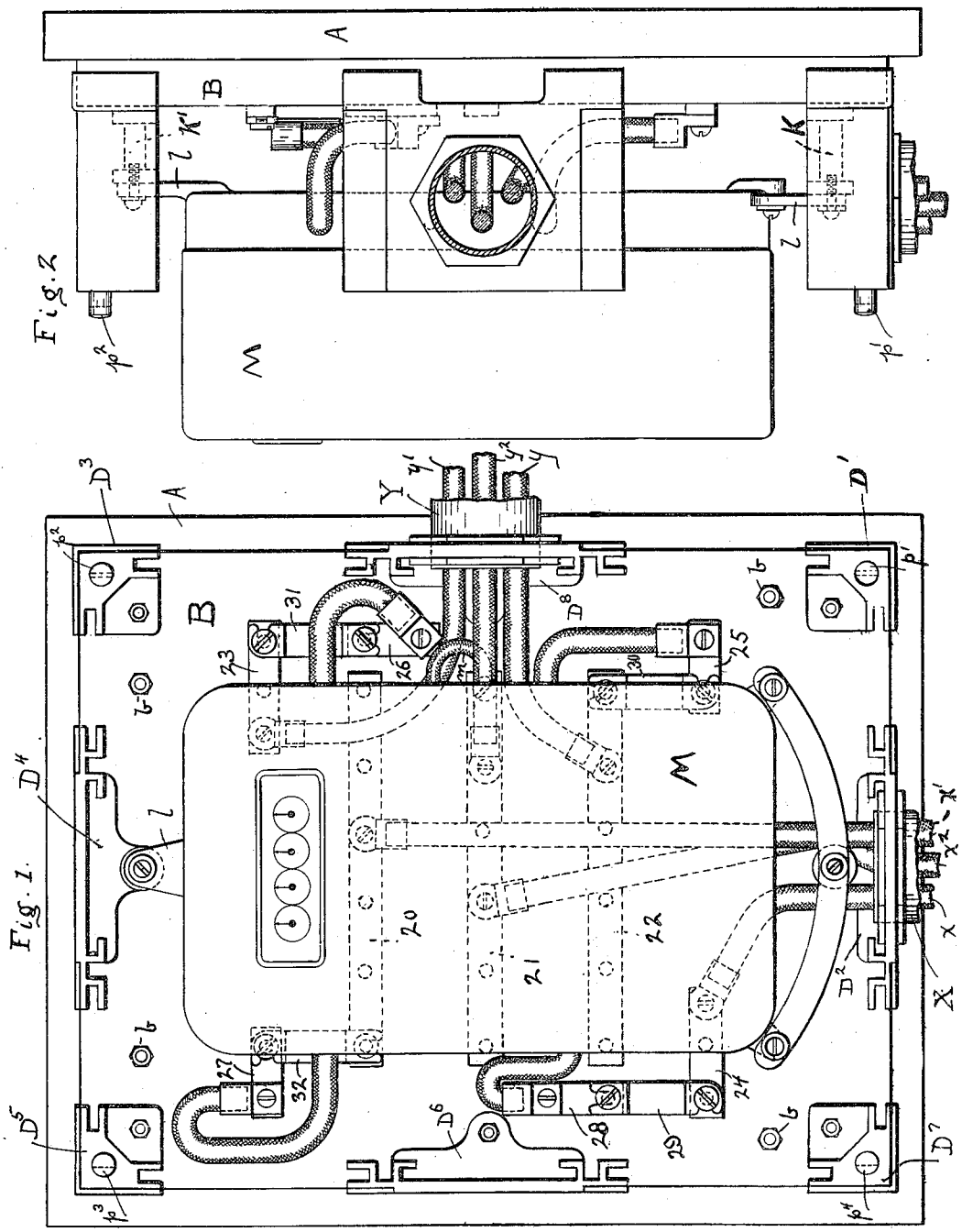
WITNESSES:
William Abbk
L. H. Grote
INVENTOR.
Walter E. McCoy
BY
Howson and Howson
ATTORNEY.

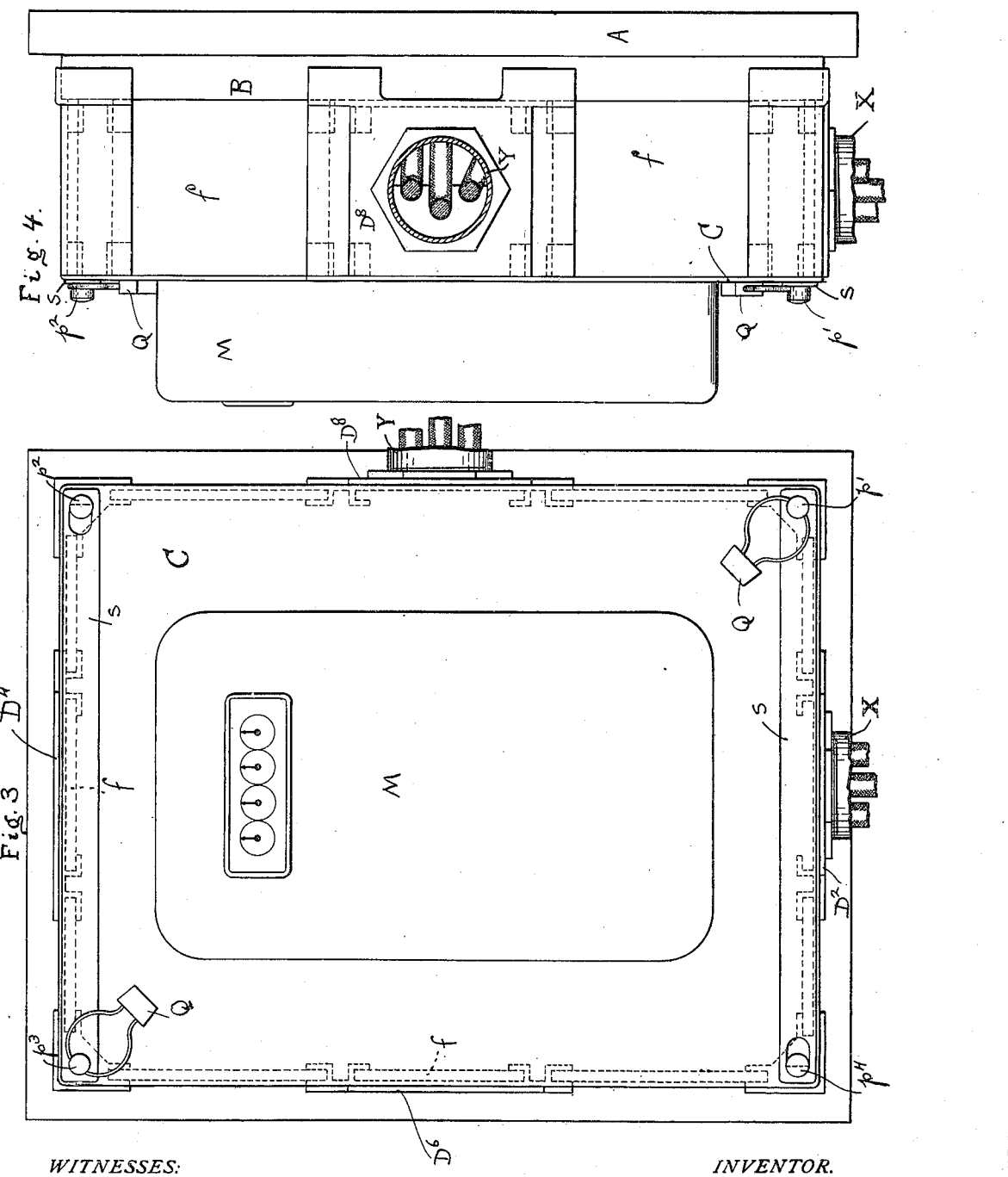

W. E. McCOY.
CONNECTION BLOCK
APPLICATION FILED AUG. 24, 1909.
993,311.
Patented May 23, 1911.
4 SHEETS—SHEET 3.
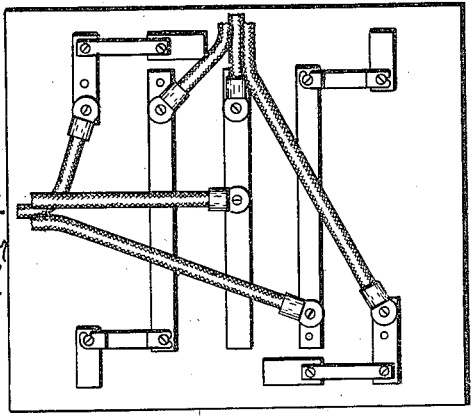
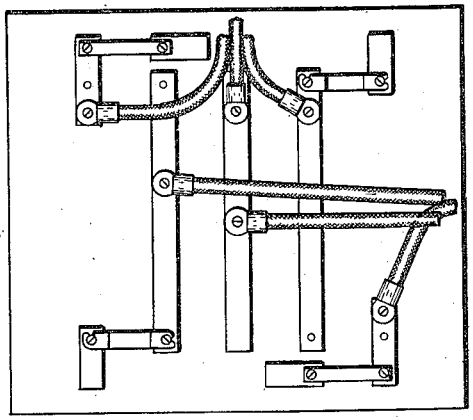
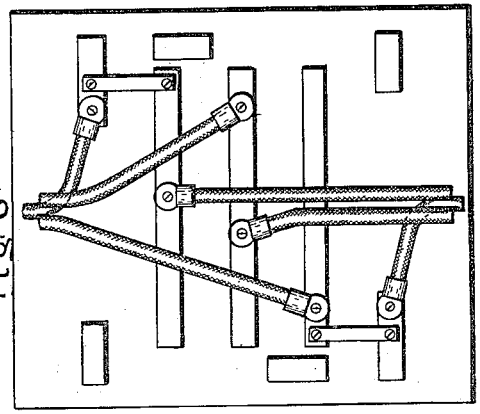
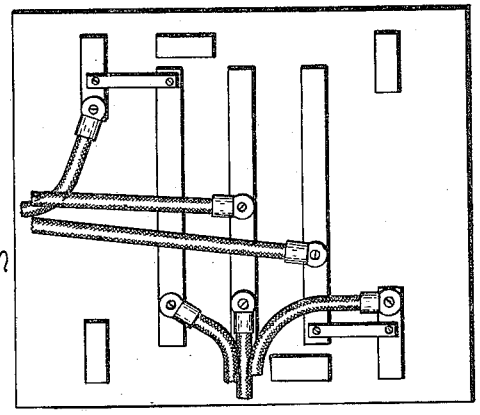
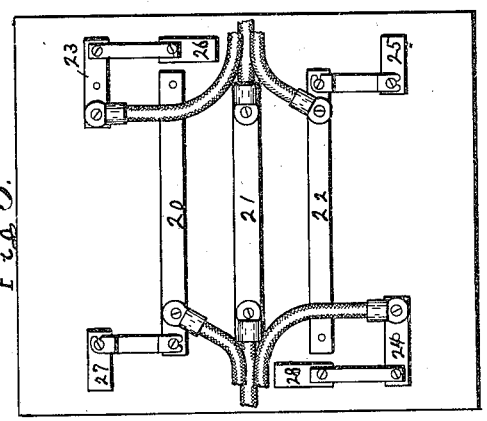
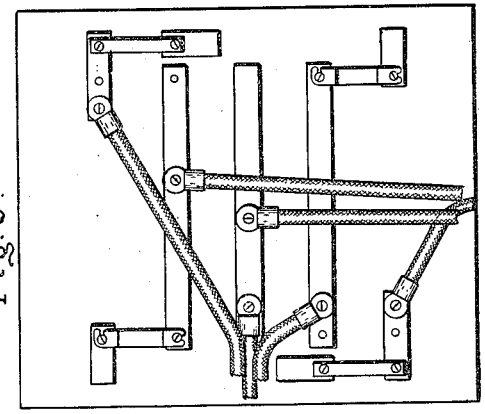
WITNESSES:
William Abk
L. H. Grote
INVENTOR.
Walter E. McCoy
BY
Howson and Howson
ATTORNEYS

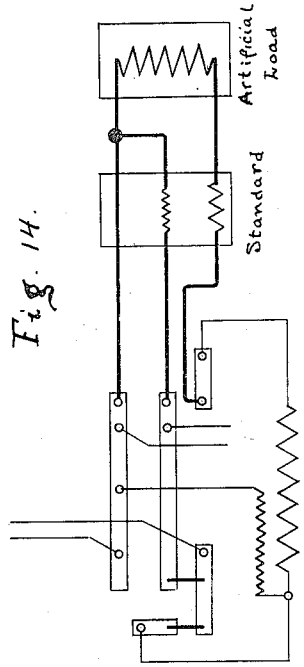
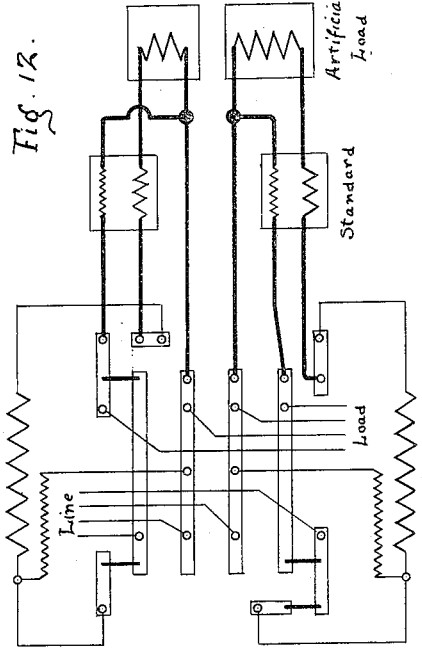
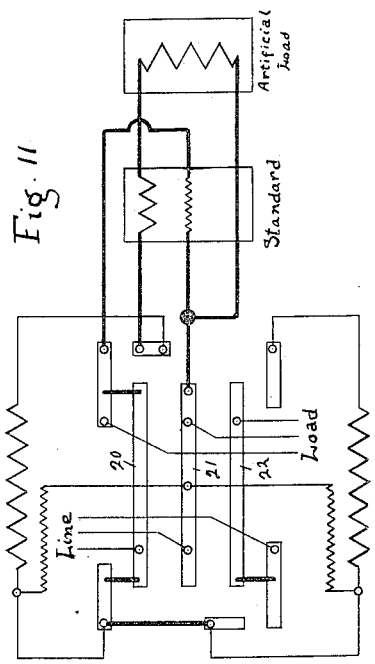
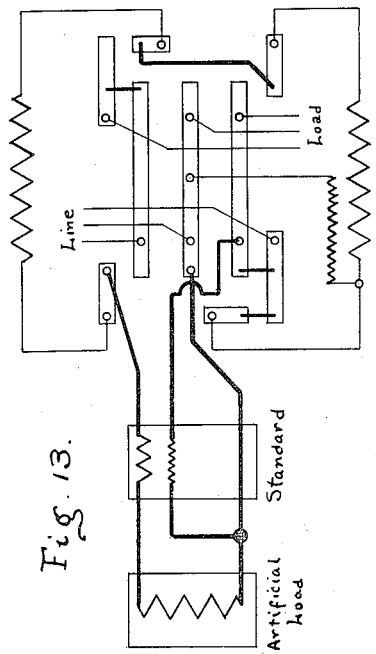

UNITED STATES PATENT OFFICE.

WALTER E. McCOY, OF NEW YORK, N. Y., ASSIGNOR OF ONE-THIRD TO FRANK W. SMITH AND ONE-THIRD TO JOSEPH G. SWALLOW, BOTH OF NEW YORK, N. Y.

CONNECTION-BLOCK.

993,311. Specification of Letters Patent. Patented May 23, 1911.

Application filed August 24, 1909. Serial No. 514,403.

*To all whom it may concern:*

Be it known that I, WALTER E. McCoy, a citizen of the United States of America, and residing in the city, county, and State of New York, have invented a certain new and useful Improvement in Connection-Blocks, of which the following is a specification.

My invention relates particularly to connection blocks for use in connecting up and testing electric meters, the special object of my invention being to provide a suitable device whereby the source and load wires between which the meter is interposed, under ordinary conditions, may be expeditiously connected in a neat and workmanlike manner, and at the same time be so located with reference to each other that the correctness of their connection not only for ordinary service but also for testing of the meter or other purpose, may be determined at a glance by one skilled in the art.

It is a further object of my invention to provide a connection block with fixed terminals of such character that the source and load wires may be led to the same from any direction and connected up in desired relation without crossing each other, while the connection from the meter to the block remains the same under any and all circumstances. Furthermore, I provide means in connection with the block whereby the meter may be disconnected in whole or in part without interrupting the connection between the source and load wires, so that it is possible not only to test portions of the meter independently, but to actually replace one meter by another, without interrupting the customer's service. I also provide means for preventing access to the live portions of the device to prevent theft of current or other tampering with the device.

Other novel features of value will appear in the following detailed description.

Referring to the drawings, Figures 1 and 2 are plan and side elevations respectively of my improved block connected up to a meter, the usual protective cover being removed; Figs. 3 and 4 are similar views with the cover in position; Figs. 5 to 10 are diagrammatic plan views of various methods of connecting the source and load wires to the block; and Figs. 11 to 14 are diagrams of the connections during various tests of the meter.

Describing my invention with reference to the embodiment thereof illustrated in the accompanying drawings, the block proper comprises a base B of insulating material which is fastened in any suitable manner, for example of bolts $b$ (Fig. 1), to the support or wall A. Upon the base are mounted independent metal straps, 20, 21, 22, 23 and 24 (for the three wire system shown in Fig. 1), which are provided with threaded perforations to receive binding screws and serve as terminals for the line and load circuits. The straps 20, 21, and 22 constitute substantially parallel extended terminal straps, the outer of which, 20 and 22, are adapted at a plurality of points to have circuit conductors, $x^1$, $y$ connected to them, while the intermediate strap 21 is at a plurality of points adapted to be connected to the two circuit conductors $x^2$ $y^2$. 23 and 24 are additional or supplemental circuit terminal straps to which the conductors $x$ and $y^1$ are connected. Short straps 25, 26, 27 and 28 serve as terminals for the connections to the upper and lower coils of a standard meter M. These short straps are provided with a second binding screw each, to receive one end of the adjustable connecting straps 29, 30, 31, 32, which may conveniently take the form of cartridge fuses, as shown, the later serving to connect the meter terminals to the wire terminals in desired relation. The meter terminal straps 25, 28, are adjacent to the ends of the extended terminal strap 22, while the meter terminal straps 26, 27 are adjacent to the ends of the extended strap 20. The additional straps 23, 24 are adjacent to the straps 26 and 28 respectively and to the corresponding ends of the extended straps 20 and 22 respectively so as to be easily connected thereto. In the example shown, assuming $x$ and $y$ to represent the positive, and $x^1$ and $y^1$ the negative wires of the line and load wires respectively, the circuit is completed as follows, $x$, terminal strap 24, fuse 29, meter terminal 28, lower meter coil, meter terminal 25, fuse 30, terminal strap 22, whence through $y$ to load and back through $y^1$, terminal strap 23, fuse 31 to meter terminal 26, upper coil of meter, meter terminal 27, fuse 32, terminal strap 20, to which line wire $x^1$ is connected. The potentials $x^2$ and $y^2$ for line and load, and $m$ for the meter are all connected to the terminal strap 21. If now it is desired to remove the meter without interrupting the load circuit, a connection strap which may take the form of a fuse of the character described, would be inserted between straps 24 and 22 at one end and between straps 23 and 20 at the other end, thereby throwing the current directly from line to load through the strap 22 and back from load to line through strap 20, thus cutting out both meter coils and permitting the removal of the meter without disturbing the customer's service. Similarly if it is desired, for example, to test the upper coil of a polyphase meter without interrupting the load circuit, as shown in the diagram Fig. 11, where the line and load circuits approach the blocks from opposite ends, the load circuit is completed directly through straps 20 and 22. The lower coil of the meter is cut out through the removal of fuse 30, while the upper coil is connected up to a single phase standard and artificial load, the shunt coils being in parallel.

In Fig. 13, both coils of the meter are connected in series and in circuit with a standard and an artificial load. In Fig. 12 a four wire polyphase meter is shown connected for use with a single phase standard and an artificial load in circuit with each element of the customer's meter, another terminal strap being employed on the connection block for this arrangement. In Fig. 14 a two wire meter is shown connected for test, the standard and artificial load being connected in circuit with the meter. Other variations will readily suggest themselves.

It will have been noted that in each of the examples shown, the line and load wires, whether for a two, three, or four wire system, are connected up to the block without crossing. This is made possible by the form of the terminal straps, 20, 21, 22, which for this purpose are made of considerable length transversely of the block and provided with series of threaded perforations so that the binding screws may be adjusted in various positions thereon. A neat, workmanlike and safe wiring is thereby rendered possible irrespective of the direction from which the line and load wires approach the block. Various examples of wiring for a three wire system are shown in Figs. 5 to 10. Furthermore by reason of the novel arrangement of the connection straps, the circuit fuses are widely separated without necessitating that the circuit shifting means be longer than one of the fuses. The use of a single standard size fuse for both purposes is thus rendered possible.

The meter M is adjusted upon the base B by means of perforated lugs $l$, adjusted over the posts K, K¹, the latter forming bolts by which the end frame plates D², D⁴, D⁶, and D⁸ with holes for the line and load conduits X and Y are secured to the base. The inner faces of these frame plates bear angled flanges serving as guides for filling plates $f$ (shown in dotted lines in Fig. 3) by means of which the unoccupied conduit holes may be closed to prevent access to the terminal wires and connection block strips. Corner frames D¹, D³, D⁵ and D⁷ with pins $p^1$, $p^2$, $p^3$, $p^4$ have similar flanges, which guide and hold the side walls of the cover C (Figs. 3 and 4), the corners of which are perforated to permit the passage of the pins $p$ therethrough. When the filler plates $f$ and the cover are adjusted, the block and its connections are thus completely inclosed. The cover may be sealed in position by metallic strips $s$, each having one end perforated so that it engages beneath the undercut head of one of the pins $p^2$ and $p^4$, while the other end fits over one of the pins $p^1$ and $p^3$ each of which is perforated to receive the shackle of a padlock Q.

Obviously my invention may be varied in detail without departing from its scope, and I do not limit myself to the precise structure shown, but claim as my invention:—

1. In a meter block, the combination of an insulating base, an extended circuit terminal strap, two meter terminal straps adjacent respectively to the ends of said extended terminal strap, an additional terminal strap adjacent to one of said meter terminal straps and to said extended strap, all of said straps being mounted upon said base, a removable fuse joining said additional terminal strap and its adjacent meter terminal strap and a removable connector joining the other meter terminal strap and the extended terminal strap, said extended terminal strap being adapted to be also connected to said additional terminal strap.

2. In a meter block the combination of an insulating base, a casing surrounding the same, and adapted to admit circuit conductors through two sides, two extended circuit terminal straps, two meter terminal straps adjacent to the ends of one of said extended terminal straps, an additional terminal strap adjacent to one of said meter terminal straps and to the extended terminal strap to which said meter terminal strap is adjacent, all of said terminal straps being mounted on said base, a removable fuse joining said additional terminal strap and its adjacent meter terminal strap and a removable connector joining the other meter terminal strap and its adjacent extended terminal strap, said last mentioned extended terminal strap being adapted to be connected at any one of a plurality of points along its length to a line conductor and the other extended terminal strap being adapted to be connected to line and load conductors respectively at any two of several points along its length.

3. In a meter connection block the combination of an insulating base, a casing surrounding the same and adapted to admit circuit conductors through two sides thereof, two extended circuit terminal straps means for connecting circuit terminals thereto, two pairs of meter terminal straps having their members adjacent respectively to the four ends of said extended terminal straps, two additional circuit terminal straps adjacent respectively to one terminal strap of each pair of meter terminal straps and to one of said extended straps, removable fuses joining respectively one meter terminal strap of each of said pairs of meter terminal straps and its adjacent additional circuit terminal strap, removable connectors joining the other meter terminal strap of each of said pairs of meter terminal straps and its adjacent extended circuit terminal strap, said additional straps being adapted to be electrically connected to their adjacent extended straps, and said extended straps being adapted to be connected at a plurality of points along their lengths to circuit conductors, a third extended terminal strap adapted to be connected to both line and load circuit conductors at a plurality of points along its length all of said terminal straps being mounted on said base.

4. In a meter connection block, the combination of an insulating base, a casing surrounding the same, and adapted to admit circuit conductors through any two of four sides thereof, two extended circuit external straps means for connecting circuit terminals thereto, two pairs of meter terminal straps having their members adjacent respectively to the four ends of said extended terminal straps, two additional circuit terminal straps adjacent respectively to one terminal strap of each pair of meter terminal straps and to one of said extended straps, removable fuses joining respectively one meter terminal strap of each of said pairs of meter terminal straps and its adjacent additional circuit terminal strap, removable connectors joining the other meter terminal strap of each of said pairs of meter terminal straps and its adjacent extended circuit terminal strap, said additional straps being adapted to be electrically connected to their adjacent extended straps, and said extended straps being adapted to be connected at a plurality of points along their lengths to circuit conductors, a third extended terminal strap adapted to be connected to both line and load circuit conductors, a plurality of points along its length, all of said terminal straps being mounted on said base, said third extended terminal strap being located between the other two extended terminal straps.

5. In a meter connection block the combination of an insulating base, a casing surrounding the same, and adapted to admit circuit conductors through any two of its four sides, two extended circuit terminal straps, means for connecting line and load circuit conductors thereto respectively, two pairs of meter terminal straps having their members adjacent respectively to the four ends of said extended terminal straps, two additional circuit terminal straps adjacent respectively to one terminal strap of each pair of meter terminal straps and to one of said extended straps, removable fuses joining respectively one meter terminal strap of each of said pairs of meter terminal straps, and its adjacent additional terminal strap, removable connectors joining the other meter terminal strap, of each of said pairs of meter terminal straps and its adjacent extended circuit terminal strap, said additional straps being adapted to be electrically connected to their adjacent extended straps, and said extended straps being adapted to be connected at a plurality of points along their lengths to line and load circuit conductors respectively, and a third extended terminal strap adapted to be connected to both line and load circuit conductors at a plurality of points along its length, said third extended strap being between the other two extended straps and all of said straps being mounted on said base.

6. In a meter connection block the combination of a base, an extended terminal strap, a meter terminal strap and an additional terminal strap adjacent to opposite ends of said extended strap, a second meter terminal strap adjacent to said additional strap, a fuse connecting said second meter strap and said additional strap, and a removable connection between said first meter strap and said extended strap, said additional strap and said extended strap being adapted to be electrically connected to one another, means for connecting line and load terminals to said additional strap and said extended strap respectively.

7. In a device of the character described, the combination of a base, a meter mounted upon the same, an extended circuit terminal strap located beneath said meter, the ends of said strap being accessible from opposite sides of said meter respectively, a meter terminal strap adjacent to one end of said extended terminal strap, an additional terminal strap adjacent to the opposite end of said extended terminal strap, said meter terminal strap and additional strap being accessible when said meter is in place, all of said straps being mounted on said base, and a removable conductor joining said meter terminal strap and said extended terminal strap, said extended terminal strap being adapted to be also connected to said additional terminal strap.

8. In a device of the character described, the combination of a base, a meter mounted upon the same, an extended circuit terminal strap located beneath said meter, the ends of said strap being accessible from opposite sides of said meter respectively, two meter terminal straps adjacent respectively to the two ends of said extended terminal strap, an additional terminal strap adjacent to one of said meter terminal straps and to said extended terminal strap, said meter terminal straps and additional strap being accessible when said meter is in place, all of said straps being mounted on said base, a removable fuse joining said additional terminal strap and its adjacent meter terminal strap, and a removable conductor joining the other meter terminal strap and said extended terminal strap, said extended terminal strap being adapted to be also connected to said additional terminal strap.

In testimony whereof I have signed my name to this specification, in the presence of two subscribing witnesses.

WALTER E. McCOY.

Witnesses:
F. H. ABEEL,
H. J. HARTT.